US006707033B2

(12) United States Patent
Okumura et al.

(10) Patent No.: US 6,707,033 B2
(45) Date of Patent: Mar. 16, 2004

(54) MASS SPECTROMETER

(75) Inventors: Akihiko Okumura, Hachioji (JP); Izumi Waki, Asaka (JP)

(73) Assignee: Hitachi-High Technologies Corporation, Tokyo (JP)

( * ) Notice: Subject to any disclaimer, the term of this patent is extended or adjusted under 35 U.S.C. 154(b) by 0 days.

(21) Appl. No.: 10/446,079

(22) Filed: May 28, 2003

(65) Prior Publication Data

US 2003/0222211 A1 Dec. 4, 2003

(51) Int. Cl.[7] .......................... H01J 49/40; B01D 59/44

(52) U.S. Cl. ....................... 250/281; 250/282; 250/287; 250/288

(58) Field of Search ................................ 250/287, 288, 250/281, 282

(56) References Cited

U.S. PATENT DOCUMENTS 5,847,386 A * 12/1998 Thomson et al. ........... 250/288
6,331,702 B1 * 12/2001 Krutchinsky et al. ....... 250/281
6,403,953 B2 * 6/2002 Whitehouse et al. ....... 250/288

* cited by examiner

*Primary Examiner*—John R. Lee
*Assistant Examiner*—Paul M. Gurzo
(74) *Attorney, Agent, or Firm*—Antonelli, Terry, Stout & Kraus, LLP

(57) ABSTRACT

In the time-of-flight mass spectrometer, after ions are accumulated in a quadrupole ion trap in a low vacuum chamber, the ions are ejected and transferred to a high vacuum chamber and are accelerated by an acceleration electrode in a direction orthogonal to the traveling direction of ions, and time of flight for the accelerated ions is measured. Total content of detected ions is calculated with a data processing unit. An ion introduction time for the next operation is determined on the basis of the obtained total ion content, the time for introduction of ions into the ion trap and a preset threshold value of the total ion content. The threshold value of total ion content is set such that the ions ejected out of the ion trap can pass through a slit formed in a partition wall for portioning the low vacuum chamber and the high vacuum chamber.

8 Claims, 5 Drawing Sheets

MASS SPECTROMETER

BACKGROUND OF THE INVENTION

The present invention relates to a mass spectrometer having an ion accumulator and a time-of-flight mass spectrometer coupled thereto and more particularly, to the provision of a mass spectrometer having both the function of multi-stage tandem mass spectrometry ($MS^n$) and a high mass accuracy of less than 5 ppm.

With advanced genome decryption for a background, a proteome analysis for comprehensively analyzing protein appearing in vivo has been noticed. An analyzing method using the mass spectrometer features high sensitivity and high throughput and serves as a leading technique for the proteome analysis. Of the analyzing methods, the tandem mass spectrometry ($MS^n$) technique can improve the analytical efficiency of the proteome analysis drastically and therefore has been thought much of.

As a mass spectrometer capable of performing the $MS^n$ spectrometry, an ion trap mass spectrometer described in U.S. Pat. No. 2,939,952 is known. In the ion trap mass spectrometer, a quadrupole electric field is formed inside an ion trap by applying an RF voltage so as to capture and accumulate ions and subsequently, accumulated ions are ejected and detected in order of smaller mass-to-charge ratios of ions by scanning the amplitude of the RF voltage, thereby undergoing mass spectrometry. In the ion trap mass spectrometer, an $MS^2$ spectrometry is made as follows. Firstly, ions are accumulated in the ion trap. Next, ions in an arbitrarily selected mass range are kept to remain and ions in other mass ranges are ejected out of the ion trap (this operation is called "isolation"). Thereafter, the selected ions (parent ions) are dissociated to create fragment ions (daughter ions) which in turn are captured in the ion trap. Finally the RF voltage is scanned, with the result that accumulated daughter ions are ejected and detected in order of smaller mass-to-charge ratios (m/z) of the daughter ions so as to undergo mass spectrometry. Out of the daughter ions, ions in a specified mass range are selected and the selected ions now personate parent ions to be applied with an operation similar to the above to create daughter ions which in turn undergo mass spectrometry. This is an $MS^3$ spectrometry. By repeating a similar operation, an $MS^n$ spectrometry can proceed. The dissociation of parent ions is achieved through collision induced dissociation (CID). In the CID, a neutral gas (target gas) is introduced into the ion trap and is caused to collide with ions to dissociate them. The $MS^n$ spectrometry can give detailed information of the structure of an analyte and is therefore a technique effective for analysis of a structure of an unknown substance. The ion trap mass spectrometer, however, faces a problem that the mass accuracy is poor because of space charge effects. The space charge effects referred to herein signify that the quadrupole electric field for capturing ions is affected by perturbation due to charges of captured ions. The larger the amount of captured ions, the more the space charge effects become noticeable, so that ions are lost and the mass resolution of mass spectrum and mass accuracy are degraded.

Known reference 1 (U.S. Pat. No. 5,572,022) discloses a method and apparatus for operating an ion trap mass spectrometer in such a manner that space charge effects do not become noticeable. A dissolved sample delivered out of a liquid chromatograph, for instance, is ionized in an ion source and then admitted to an ion trap. By controlling a lens system arranged immediately before the ion trap, ions can be admitted to the ion trap for a constant period of time. In the case of an $MS^n$ spectrometry, selection and dissociation of parent ions are performed. Finally, by scanning an RF voltage, mass spectrometry of ions captured in the ion trap is carried out. This operation is repeated until delivery of the dissolved sample from the liquid chromatograph ends. At that time, the time for introducing ions into the ion trap is determined on the basis of total content of ions detected in a mass spectrometry carried out immediately precedently and a threshold value preset in advance. The threshold value referred to herein is set to an amount of ions with which the space charge effects will not become noticeable. In the ion trap mass spectrometer, however, a neutral gas prevails inside the ion trap and hence collisions of ions with the gas take place even during mass spectrometry. Since a cross-section of collision with the gas differs to a great extent depending on the kind of ions and even for ions of the same m/z (mass-to-charge ratio), the ions are detected at shifted times. This makes it difficult to attain a mass accuracy of less than 0.1 amu (atomic mass unit) with the ion trap mass spectrometer.

Known reference 2 (B. M. Chien, S. M. Michael and D. M. Lubman, Rapid Commun. Mass in Spectrometry, Vol. 7, 837. (1993)) discloses an apparatus having an ion trap and a time-of-flight mass spectrometer coupled thereto. In the apparatus, a process up to capture and isolation of ions and dissociation of ions is carried out inside the ion trap and mass spectrometry of daughter ions is performed by means of the time-of-flight mass spectrometer. The time-of-flight mass spectrometer features a high mass accuracy of less than 5 ppm. But in the apparatus, the ion trap also serves as a portion of the time-of-flight mass spectrometer (accelerator) and as a result, collisions of ions with a neutral gas take place during mass spectrometry. Consequently, measurement accuracy of time of flight, accordingly, mass resolution and mass accuracy are degraded.

Known reference 3 (JP-A-2001-297730) discloses another type of apparatus having an ion trap and a time-of-flight mass spectrometer in combination. In the apparatus, a process up to capture and isolation of ions and dissociation of ions are carried out inside the ion trap and mass spectrometry of daughter ions is performed by means of the time-of-flight mass spectrometer. In the apparatus, the ion trap and the mass spectrometer are separated from each other, so that ions accumulated in the ion trap are once ejected out of the ion trap and then introduced to the time-of-flight mass spectrometer so as to undergo mass spectrometry therein. Inside the time-of-flight mass spectrometer, an acceleration field is formed in a direction orthogonal to the traveling direction of ions and time of flight required for ions to reach a detector from an accelerator is measured. The interior of the time-of-flight mass spectrometer is maintained at high vacuum and collisions of ions with gas hardly take place therein. Therefore, an $MS^n$ spectrometry can be executed at a high mass accuracy the time-of-flight mass spectrometer has.

SUMMARY OF THE INVENTION

Disadvantageously, in the ion trap mass spectrometer, loss of ions occurs inside the ion trap owing to the space charge effects and the mass resolution of mass spectrum and mass accuracy are degraded. In the known reference 1, the amount of ions accumulated in the ion trap can be so adjusted as to prevent the space charge effects from becoming noticeable but mass spectrometry is performed by means of the ion trap and there results a mass accuracy of only less than 0.1 amu.

This accuracy is insufficient for proteome analysis. In the known reference 2, the apparatus is disclosed in which mass spectrometry of ions accumulated in the ion trap is performed by means of the time-of-flight mass spectrometer having high mass accuracies. But, since the ion trap also serves as an accelerator of the time-of-flight mass spectrometer, collisions of ions with gas take place inside and near the ion trap, with the result that the high mass accuracy the time-flight-mass spectrometer originally has cannot be realized. In the known reference 3, mass spectrometry is carried out after ions accumulated in the ion trap have been transferred to the time-of-flight mass spectrometer representing a high vacuum chamber, so that $MS^n$ spectrometry can be performed at a high mass accuracy of less than 5 ppm the time-of-flight mass spectrometer has. Accordingly, the apparatus of reference 3 can be utilized sufficiently even for proteome analysis. However, the interior of the time-of-flight mass spectrometer needs to be maintained at high vacuum and hence, there are constraints imposed on the size of an inlet for introducing ions to the inside of the time-of-flight mass spectrometer. In addition, the inlet fills also the role of prescribing the width of an ion beam to realize high resolution and in this point, the size of the inlet is limited. On the other hand, spatial distribution of ions accumulated in the ion trap increases as the amount of ions to be accumulated increases. Ultimately, when the amount of accumulated ions exceeds a constant level, part of ions ejected out of the ion trap cannot pass through the inlet of the time-of-flight mass spectrometer. In other words, when the ion accumulation amount exceeds the constant level, signal intensity becomes saturated. Disadvantageously, the quantification accuracy becomes therefore poor. The proteome analysis aims at identifying protein with high accuracies and at the same time, examining the difference in the amounts of appearing protein. Accordingly, the quantification accuracy is important.

An object of the present invention is to provide an apparatus which can perform mass spectrometry and multi-stage MS/MS spectrometry with high mass accuracies and high quantitative accuracies.

According to the present invention, in an ion trap/time-of-flight mass spectrometer in which ions accumulated in an ion trap are introduced into a time-of-flight mass spectrometer, a field orthogonal to the traveling direction of ions is applied in the time-of-flight mass spectrometer to accelerate ions and time of flight required for the ions to reach a detector is measured, ions are accumulated for a constant period of time in the ion trap, accumulated ions are then ejected out of the ion trap and introduced into the time-of-flight mass spectrometer, total content of ions introduced into the time-of-flight mass spectrometer is measured, and an ion accumulation time for the next operation is determined on the basis of a result of measurement of the total ion content and a preset threshold value. The threshold value is an amount of ions or a value corresponding thereto when all ions or almost all the ions accumulated in the ion trap can pass through the inlet of the time-of-flight mass spectrometer.

It is desirable that the value of total content of ions reaching the interior of the time-of-flight mass spectrometer be measured accurately but disadvantageously, the accuracy will be impaired for the following reasons. Since time for ions to move from the ion trap to an orthogonal accelerator inside the time-of-flight mass spectrometer depends on mass-to-charge ratios of ions, only ions which are traveling through the inside of the accelerator at the time that the acceleration voltage is applied can undergo spectrometry. In other words, a mass range that can be subject to one operation of spectrometry (this is called a mass window) is limited. Accordingly, a measured amount of total ion content becomes inaccurate. In the present invention, this problem can be solved through three types of contrivance or features as below.

(1) A means for applying an auxiliary AC voltage to the ion trap is used to limit the mass range of ions that can be captured by the ion trap. The limited mass range is set within a range of mass window.

(2) A mass filter is interposed between the ion source and the ion trap and the pass band of the mass filter is set within the range of mass window.

(3) When measuring total content of ions that have passed through the inlet of the time-of-flight mass spectrometer, ions having passed though the slit are not accelerated orthogonally but are caused to travel rectilinearly so as to be detected by a detector.

Known reference 4 (C. Marinach, A. Brunot, C. Beaugrand, G. Bolbach, J.-C. Tabet, Proceedings of the 49th ASMS Conference on Mass Spectrometry and Allied Topics, Chicago, Ill., May 27–31, 2001) discloses a method for forming a quasi-continuous beam by dispersing ions ejected out of an ion trap in the ejection direction. In this case, during passage of an ion beam through an accelerator, orthogonal acceleration of ions is conducted repeatedly. This method can eliminate the mass window but only ions which are traveling inside the accelerator can undergo spectrometry, raising a problem that ions pass through the accelerator during an interval of each spectrometry operation. Ions of lower m/z have higher speeds and therefore, the amount of ions passing through the accelerator depends on m/z. Accordingly, measurement of the value of total ion content still remains inaccurate. In this case, the means (3) as above is effective.

Other objects, features and advantages of the invention will become apparent from the following description of the embodiments of the invention taken in conjunction with the accompanying drawings.

DESCRIPTION OF THE EMBODIMENTS

Figure 1:
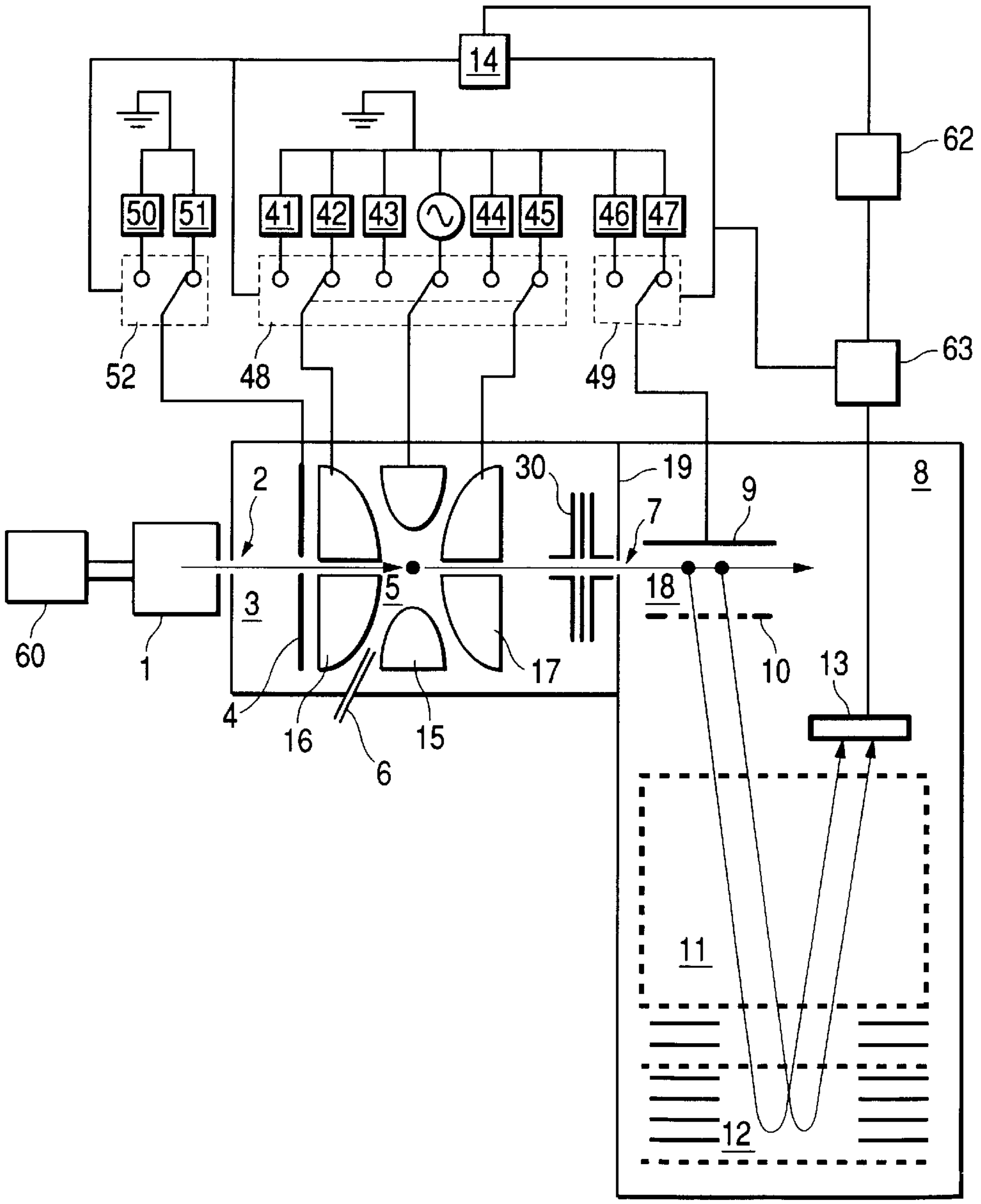
FIG. 1 is a diagram showing the construction of a mass spectrometer according to the invention.

Referring first to FIG. 1, a mass spectrometer according to the invention is constructed as shown therein. A dissolved sample delivered out of a liquid chromatograph 60, for instance, is ionized in an ion source 1. Ions pass through a sampling orifice 2 so as to be introduced into a first vacuum chamber 3, in which they pass through a gate electrode 4 to enter a quadrupole ion trap 5. A neutral gas (helium, argon, nitrogen or the like) is admitted to the interior of the ion trap 5 through a gas tube 6. The neutral gas fills the role of not only improving the efficiency of capturing ions but also serving as target gas in CID. After ions are introduced into the ion trap and accumulated therein for a constant period of time, a voltage applied to the gate electrode 4 is switched by means of a switch 52 to stop the introduction of the ions into the ion trap 5. Subsequently, a switch 48 is transferred to stop application of an RF voltage to a ring electrode 15. Concurrently with the stoppage of application of the RF voltage, a DC voltage is applied to end-cap electrodes 16 and 17 and the ring electrode 15 to form a DC field inside the ion trap. As a result, the ions accumulated in the ion trap 5 are ejected therefrom. The ions ejected out of the ion trap pass through a lens 30 for focusing an ion beam and pass through a slit 7 formed in a partition wall 19 for partitioning the first vacuum chamber 3 and a second vacuum chamber 8 to enter the second vacuum chamber 8. Since the neutral gas has been admitted to the ion trap, the first vacuum chamber is at a low vacuum degree of about $10^{-4}$ to $10^{-5}$ Torr. Contrary to this, with the aim of reducing collisions of ions with gas, the second vacuum chamber is set to a high vacuum degree of about $10^{-6}$ to $10^{-7}$ Torr. The ions having entered the second vacuum chamber take a flight in the internal space of accelerator 18. During the flight of the ions in the internal space of the accelerator, a switch 49 is transferred to apply a pulse high voltage (about 10 kV) to an acceleration electrode 9, thus forming an acceleration field in a direction orthogonal to the flight direction of ions. Accelerated ions are further accelerated between electrodes 10 and 11 to take a flight in a no-field space surrounded by the electrode 11 so as to enter a reflectron 12. Inside the reflectron 12, the ions are reverted to again take a flight through the no-field space to thereby reach a detector 13. A controller 14 controls transfer of the switches 48, 49 and 52. During an interval of time ranging from the ejection of the ions from the ion trap to the subsequent application of the acceleration pulse to the orthogonal accelerator, the voltage to the gate electrode is switched to resume introduction of ions. This operation is repeated until delivery of the dissolved solution from the liquid chromatograph or the like ends.

Figure 4:
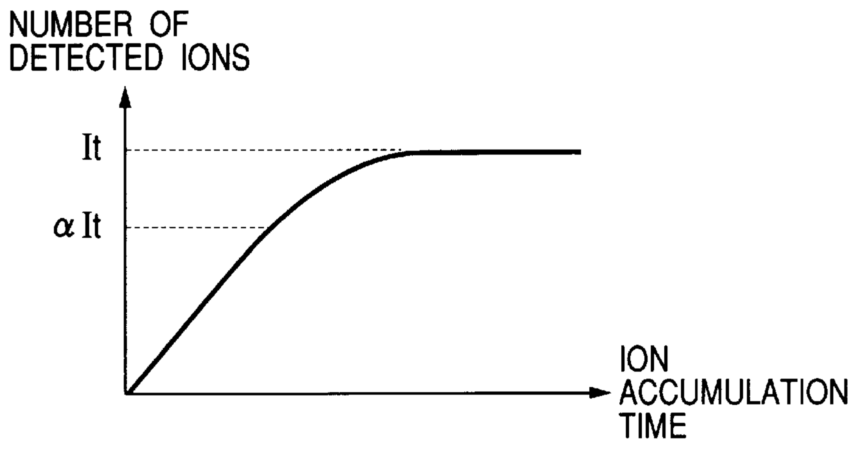
FIG. 4 is a graph for explaining a threshold value of total ion content.

After a delay time (Td) following the application of the pulse voltage to the acceleration electrode, an output of the detector 13 is sampled by means of an AD converter 63. Sampling continues for a time Ts. Values of Td and Ts are set in accordance with a mass range subject to spectrometry. A data processing unit 62 calculates an integrated value of all sampling data during the time Ts. This value is taken for a value of total ion content (Is) and an ion introduction time Tn+1 for the next operation is calculated on the basis of the Is, a preset threshold value It and a time Tn of ion introduction into the ion trap, that is, the current ion introduction time. As an expression for calculation, $Tn+1=\alpha(It/Is)Tn$ is used, where $\alpha$ is an coefficient. Graphically illustrated in FIG. 4 is the relation between number of detected ions and the ion introduction time. The threshold value It is an upper limit of number of detected ions or a value approximating the same. By determining data as shown in FIG. 4 through preliminary experiments, the value of It is determined in advance. The coefficient $\alpha$ is set to a value less than 1, which is typically about 0.7 to 0.9. When Is nearly equals It, there is a possibility that the amount of ions is saturated and therefore, with $\alpha=1$, control of the amount of ions becomes inaccurate. Conversely, when $\alpha$ is too small, the ion introduction time becomes short and disadvantageously, the sensitivity is degraded. With a view to enhancing the accuracy of measurement of Is, a plurality of spectrometry operations may be carried out with the ion introduction time fixed and integral values for Is may be averaged to provide a value of the Is. The data processing unit 62 calculates Tn+1, and the Tn+1 or a signal corresponding thereto is transferred to the controller 14. In accordance with the transferred signal, the controller 14 sets an ion introduction time for the next operation.

While ions are admitted to the ion trap, auxiliary AC voltages from AC power supplies 42 and 45 may be applied to the two end-cap electrodes to ensure that only ions within a range of mass window can be accumulated and other ions can be ejected out of the ion trap. In some applications, by applying the acceleration voltage (pulse voltage) plural times to the acceleration electrode to perform spectrometry plural times during an interval of time starting with the ejection of ions accumulated in the ion trap and subsequently ending in the next ejection of ions, a plurality of mass ranges (mass windows) can be subjected to spectrometry. In this case, only ions in the range of the plurality of mass windows are accumulated and other ions are ejected out of the ion trap. As described above, by making the mass range of ions to be accumulated in the ion trap coincident with a detectable mass range or setting it within the detectable mass range, total ion content can be measured accurately and therefore, the accuracy of ion amount control can be improved.

Figure 2:
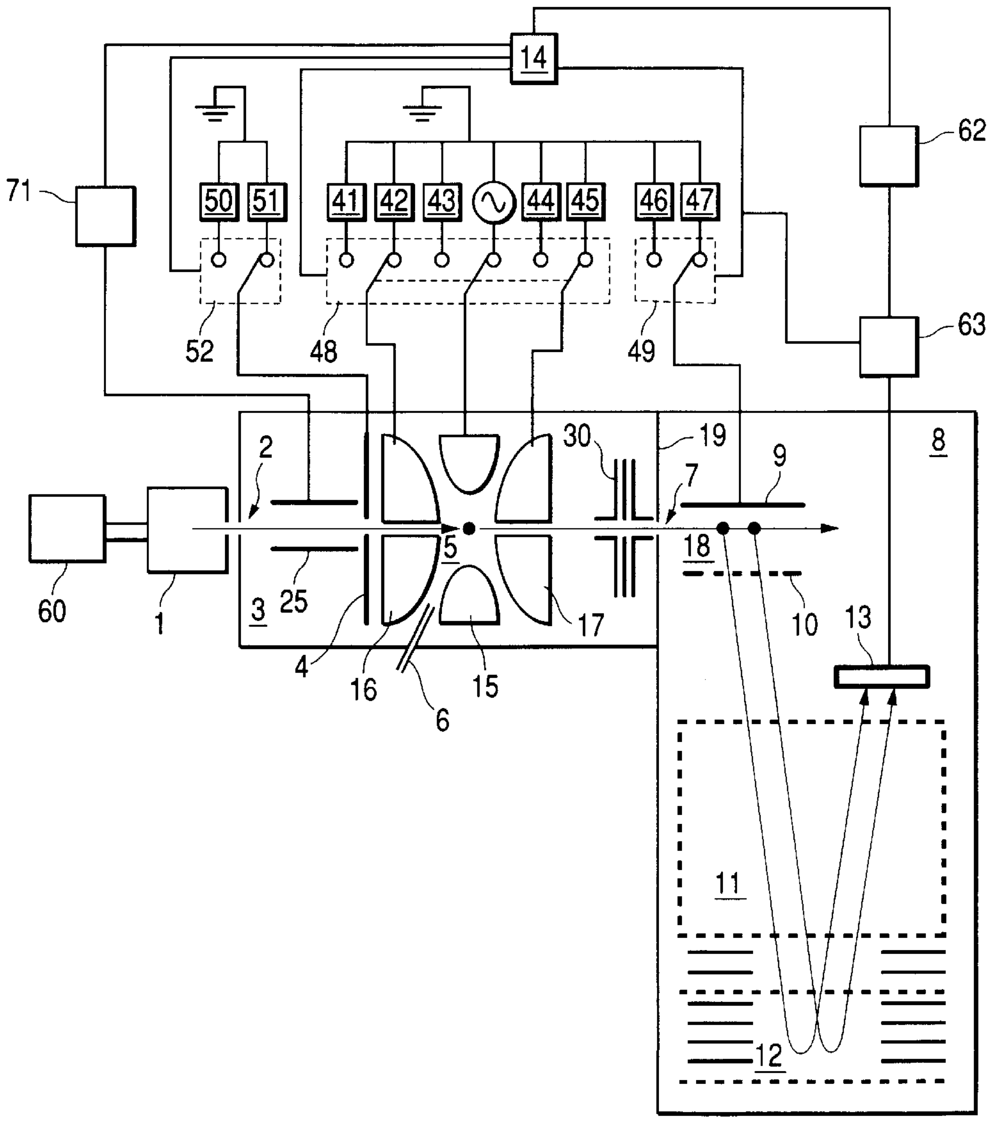
FIG. 2 is a diagram showing the construction of a mass spectrometer with a mass filter according to the invention.

To attain similar effects, a mass filter can be disposed in front of the gate electrode and the mass pass range of the mass filter can be set within the range of mass window. This type of apparatus is constructed as shown in FIG. 2. Ions created in the ion source 1 are introduced into the first vacuum chamber 3 through sampling orifice 2 and they pass through a quadrupole filter 25 and the gate electrode 4 so as to be introduced into the ion trap 5. As an example, the quadrupole filter is used as a mass filter but this is not limitative. An RF voltage and a DC voltage from a power supply 71 are applied to the quadrupole filter. With these voltage values, the passable mass range can be controlled. With the mass filter used, unwanted ions can be eliminated before ions enter the ion trap, thereby giving rise to an advantage that undesirable phenomena such as a degraded capturing efficiency due to space charge and an ion/ion reaction can be alleviated.

Figure 3:
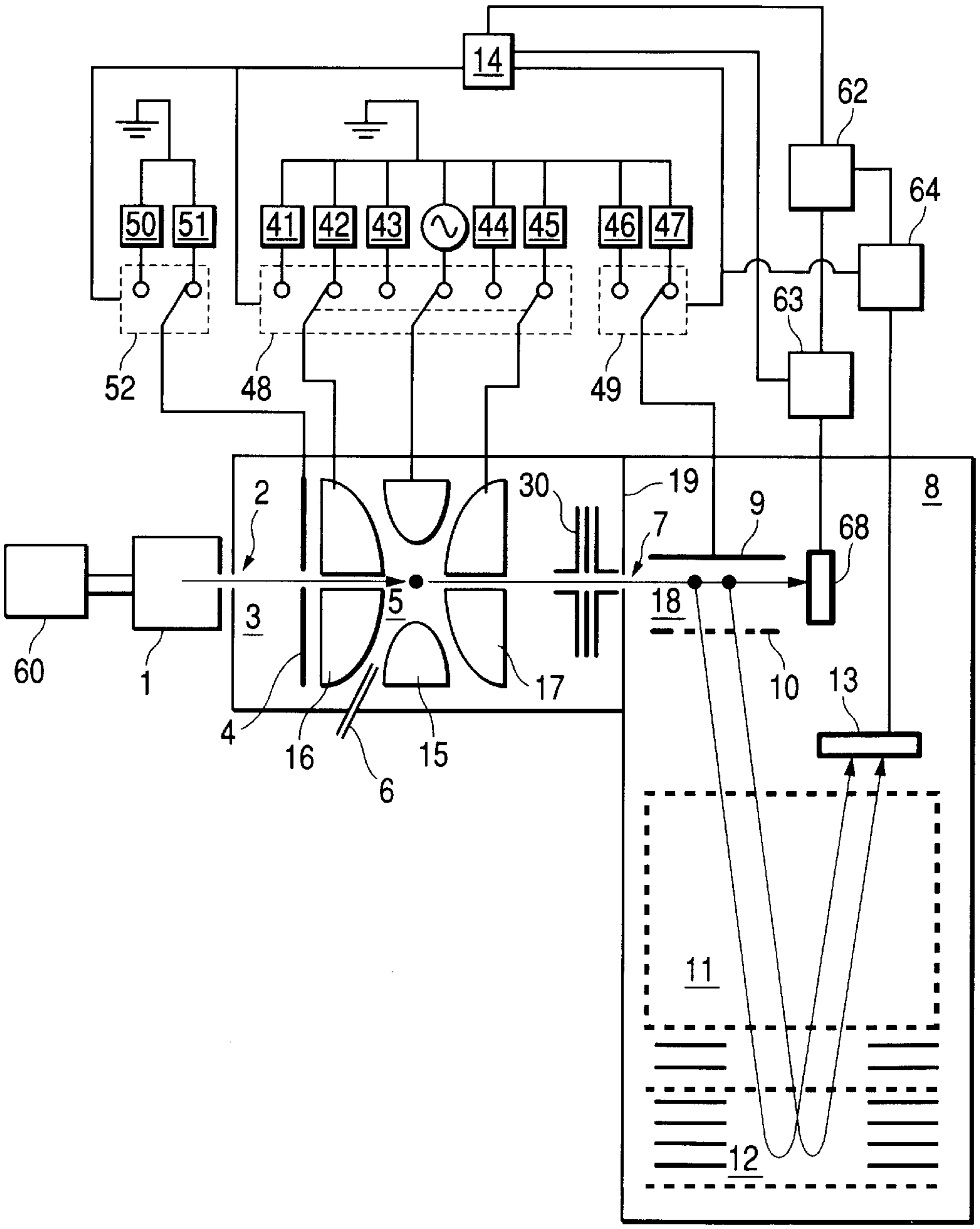
FIG. 3 is a diagram showing a mass spectrometer constructed differently according to the invention.

Referring to FIG. 3, there is illustrated a mass spectrometer of still another type of construction according to the invention. In the present apparatus, in addition to the spectrometric detector 13 (detector for spectrometry) adapted for mass spectrometry of ions, a second detector 68 for detecting ions having passed through the accelerator is arranged to measure total ion content (Is). In the case of measurement of the total ion content, acceleration voltage is not applied to the acceleration electrode 9, thereby causing ions having passed through the slit to travel rectilinearly and reach the second detector 68. In case the mass spectrometry of ions is to be performed, the acceleration voltage is applied to the acceleration electrode 9 to cause ions to be detected by means of the detector 13. With this construction, no constraints are imposed on the mass window, to advantage. In the figure, in addition to an AD converter 63 provided for the detector 68, an AD converter 64 provided for the mass spectrometric detector 13 is used but a single AD converter may be used in a switchover fashion.

Figure 5:
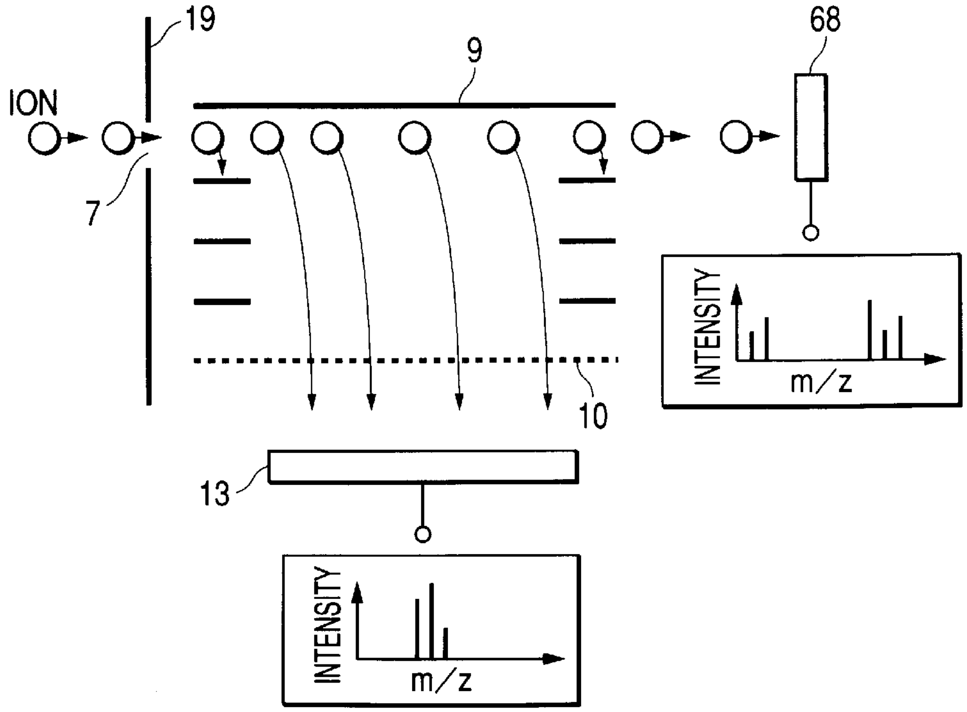
FIG. 5 is a schematic diagram for explaining ion detection in the construction of FIG. 3.

With this method, however, spectrometry of ions is interrupted during measurement of the total ion content and consequently the utilization efficiency of sample is low, leading to a problem that the sensitivity is degraded. Then, as diagrammatically shown in FIG. 5, concurrently with execution of spectrometry of ions, total content (Is1) of ions having passed through the accelerator is detected using the second detector and is added to total content (Is2) of ions detected by the spectrometric detector to obtain the sum which represents an amount of total ion content (Is). In case the multiplication factor and sampling rate differ for the spectrometric detector and second detector, Is1 or Is2 is multiplied by a suitable coefficient and then the two are added together. In this case, ions prevailing near an analyzable mass range (mass window) as shown in FIG. 5 are accelerated under the application of acceleration voltage to the acceleration electrode while impinging upon the electrode and so on, failing to reach any detectors. But in comparison with the case where the second detector is not used, the total ion content can be measured more accurately.

In some applications, a plurality of spectrometry operations are performed by applying the acceleration voltage (pulse voltage) plural times to the acceleration electrode during an interval of time starting with the ejection of ions accumulated in the ion trap and subsequently ending in the execution of the next ion ejection, thereby ensuring that a plurality of mass ranges (mass window) can undergo spectrometry. In this case, a value of total content of ions detected by the spectrometric detector in the plurality of spectrometry operations and a value of total content of ions detected by the second detector are added to provide the sum which represents Is.

In some case, ions ejected out of the ion trap are dispersed in the direction of ejection and they form a continuous beam at the time that they pass through the orthogonal accelerator. In this case, the acceleration voltage (pulse voltage) can be applied plural times to the acceleration electrode to perform spectrometry plural times during an interval of time starting with the ejection of ions accumulated in the ion trap and subsequently ending in the next ion ejection, thereby improving the detection sensitivity. In such a case, constraints on the mass window can substantially be eliminated. But, there arises a problem that during an interval of each spectrometry operation, part of ions reaching the accelerator with a retardation pass through the accelerator. Ions of lower m/z have faster speeds and the amount of ions passing through the accelerator is larger. Accordingly, the detection efficiency of ions by the spectrometric detector depends on the m/z of ions. Therefore, a value of total ion content measured using only the spectrometric detector is inaccurate. In this case, a value of total content of ions detected by the spectrometric detector in a plurality of spectrometry operations and a value of total content of ions detected by the second detector are added to provide the sum which represents Is. Through this, the value of total ion content can be measured accurately.

Figure 6:
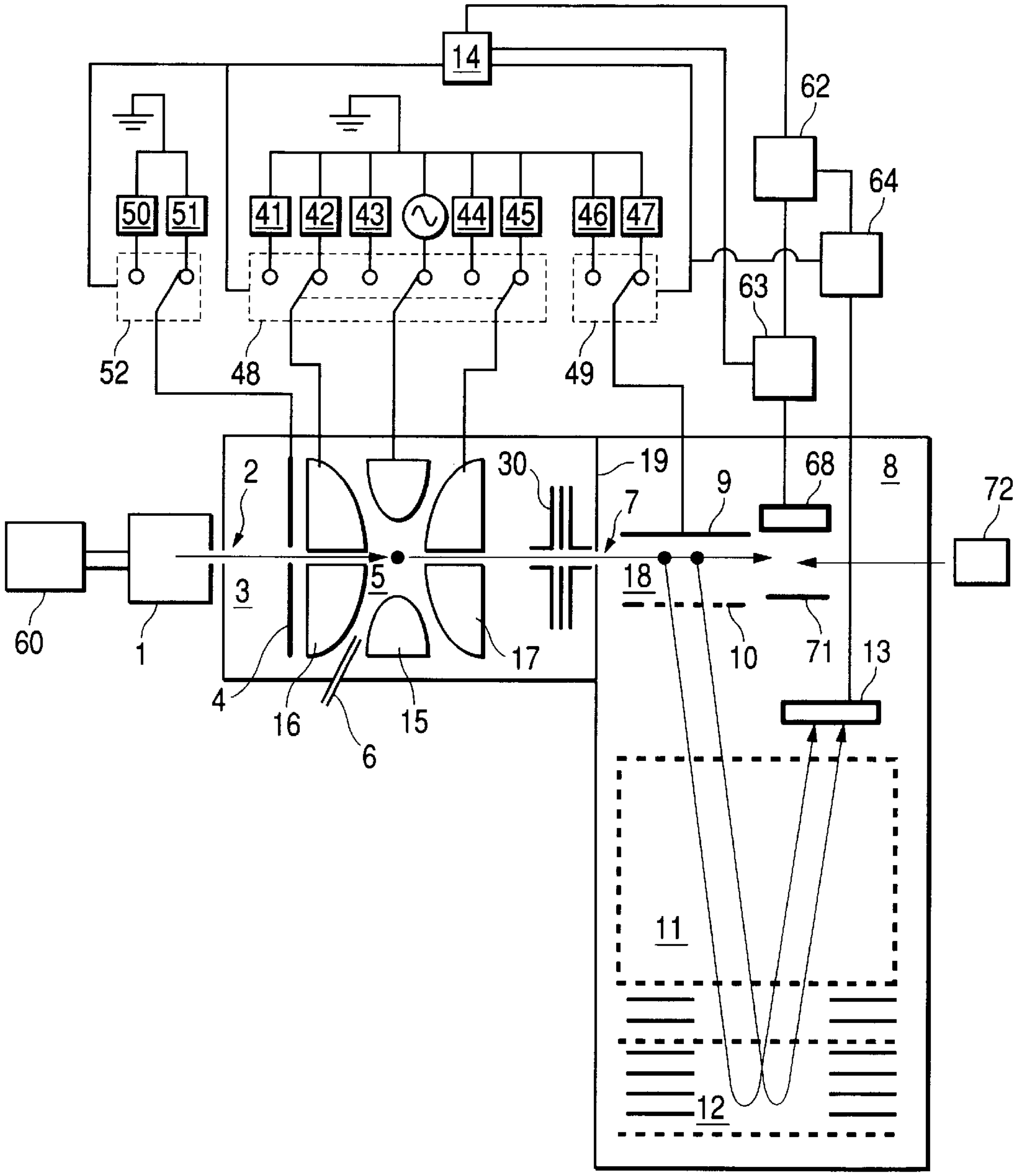
FIG. 6 a diagram showing a mass spectrometer so constructed as to permit laser irradiation according to the invention.

A method has been known which uses infrared laser light as a means for dissociating ions accumulated in the ion trap. The use of infrared laser light has an advantage that higher dissociation efficiency than that in CID can be obtained. Structurally, as shown in FIG. 6, ions having passed through the orthogonal accelerator are deflected by means of a deflection electrode 71 and detected by a second detector 68. With this construction, laser light from a laser 72 can enter the ion trap through slit 7 and an ion pass hole of end-cap electrode 17. Accordingly, a laser incident hole need not be provided newly for the ion trap.

The foregoing embodiments have been described by way of example of the ion source arranged outside the ion trap but similar effects can be attained with an apparatus for ionizing a sample by using a method of performing electro ionization inside the ion trap when ionization time substituting for ion introduction time is controlled in a manner similar to that in the present invention.

In the mass spectrometer in which ions ejected out of the ion trap are orthogonally accelerated and are caused to undergo mass spectrometry by means of the time-of-flight mass spectrometer, time for introducing ions into the ion trap is set on the basis of a value of total content of detected ions so that the amount of ions passing through the slit interposed between the ion trap and the time-of-flight mass spectrometer can be so controlled as not to be saturated, thus improving the quantitative accuracy. As a result, an apparatus can be provided which can perform mass spectrometry and multi-stage MS/MS spectrometry with high mass accuracies and high quantitative accuracies.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A mass spectrometer comprising:

a first vacuum chamber in which an ion accumulator is arranged;

a second vacuum chamber serving as a time-of-flight mass spectrometer;

a slit formed in a partition wall for partitioning said two vacuum chambers;

means for controlling time for accumulating ions in said ion accumulator; and means for ejecting accumulated ions out of said ion accumulator, wherein said ejected ions are detected by said time-of-flight mass spectrometer, a value corresponding to total content of detected ions is calculated, and an ion accumulation time for the next operation is set on the basis of the value of total ion content, the current ion accumulation time and a preset threshold value of the total ion content.

2. A mass spectrometer according to claim 1 further comprising:

a unit for limiting a mass range of ions to be accumulated by controlling a voltage applied to said ion accumulator; and a unit for setting a delay time between the ejection of ions out of said ion accumulator and the start of time-of-flight mass spectrometry, said mass range being set in correspondence with said delay time.

3. A mass spectrometer according to claim 1 further comprising:

an ion source arranged outside said ion accumulator;

a mass filter interposed between said ion source and said ion accumulator;

a unit for limiting a mass range of ions passing through said mass filter by controlling an application voltage to said mass filter; and a unit for setting a delay time between the ejection of ions out of said ion accumulator and the start of time-of-flight mass spectrometry, said mass range being set in correspondence with said delay time.

4. A mass spectrometer according to claim 1 further comprising a detector for detecting ions having passed through an accelerator of said time-of-flight mass spectrometer, wherein a value corresponding to total content of ions detected by said detector is calculated, and an ion accumulation time for the next operation is set on the basis of the value of total ion content, the current ion introduction time and a preset threshold value of the total ion content.

5. A mass spectrometer according to claim 4, wherein a value corresponding to the sum of total content of ions detected by said detector and total content of ions detected by a detector of said time-of-flight mass spectrometer is calculated, and an ion accumulation time for the next operation is set on the basis of the value of total ion content, the current ion introduction time and a preset threshold value of the value of total ion content.

6. A mass spectrometer according to claim 5, wherein time-of-flight mass spectrometry is performed plural times between the ejection of ions out of said ion trap and the next ejection of ions, a value corresponding to the sum of total content of ions detected by said detector and total content of ions detected by said detector of said time-of-flight mass spectrometer is calculated, and an ion accumulation time for the next operation is set on the basis of the value of total ion content, the current ion introduction time and a preset threshold value of the value of total ion content.

7. A mass spectrometer according to claim 5 further comprising a deflection electrode for deflecting the trajectory of ions having passed through said accelerator of said time-of-flight mass spectrometer, wherein ions deflected by said deflection electrode are detected with said detector.

8. A mass spectrometer according to claim 4 further comprising a deflection electrode for deflecting the trajectory of ions having passed through said accelerator of said time-of-flight mass spectrometer, wherein ions deflected by said deflection electrode are detected with said detector.

* * * * *

UNITED STATES PATENT AND TRADEMARK OFFICE

CERTIFICATE OF CORRECTION

PATENT NO. : 6,707,033 B2
DATED : March 16, 2004
INVENTOR(S) : Okumura et al.

It is certified that error appears in the above-identified patent and that said Letters Patent is hereby corrected as shown below:

Title page,
Insert Item -- [30] Foreign Application Priority Data,
May 28, 2002 (JP) ……………….. 2002-153257 --

Signed and Sealed this

Second Day of August, 2005

JON W. DUDAS
*Director of the United States Patent and Trademark Office*